United States Patent
Ashmore

(10) Patent No.: US 8,356,126 B2
(45) Date of Patent: Jan. 15, 2013

(54) COMMAND-COALESCING RAID CONTROLLER

(75) Inventor: Paul Andrew Ashmore, Longmont, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 837 days.

(21) Appl. No.: 11/718,990

(22) PCT Filed: Feb. 7, 2006

(86) PCT No.: PCT/US2006/004275
§ 371 (c)(1),
(2), (4) Date: Sep. 24, 2007

(87) PCT Pub. No.: WO2006/086379
PCT Pub. Date: Aug. 17, 2006

(65) Prior Publication Data
US 2008/0120463 A1    May 22, 2008

Related U.S. Application Data

(60) Provisional application No. 60/650,720, filed on Feb. 7, 2005.

(51) Int. Cl.
G06F 3/00 (2006.01)
(52) U.S. Cl. ...................................................... 710/56
(58) Field of Classification Search ................ None
See application file for complete search history.

(56) References Cited

U.S. PATENT DOCUMENTS

| | | | |
|---|---|---|---|
| 5,522,054 A | 5/1996 | Gunlock et al. | |
| 5,680,573 A | 10/1997 | Rubin et al. | |
| 5,860,003 A * | 1/1999 | Eidler et al. | 718/106 |
| 6,092,149 A | 7/2000 | Hicken et al. | |
| 6,195,727 B1 * | 2/2001 | Islam et al. | 711/114 |
| 6,226,713 B1 | 5/2001 | Mehrotra | |
| 6,321,300 B1 | 11/2001 | Ornes et al. | |
| 6,505,268 B1 | 1/2003 | Schultz et al. | |
| 6,549,977 B1 | 4/2003 | Horst et al. | |
| 6,567,892 B1 | 5/2003 | Horst et al. | |
| 6,775,794 B1 * | 8/2004 | Horst et al. | 714/42 |
| 6,842,792 B2 | 1/2005 | Johnson et al. | |
| 2003/0088734 A1 * | 5/2003 | Cavallo et al. | 711/114 |
| 2004/0064594 A1 * | 4/2004 | Pooni et al. | 710/1 |
| 2005/0203874 A1 * | 9/2005 | Lubbers et al. | 707/1 |
| 2006/0075144 A1 * | 4/2006 | Challener et al. | 709/250 |

* cited by examiner

*Primary Examiner* — Henry Tsai
*Assistant Examiner* — Aurangzeb Hassan
(74) *Attorney, Agent, or Firm* — Thomas J. Lavan

(57) ABSTRACT

A RAID controller is disclosed. The controller controls at least one redundant array of physical disks, receives I/O requests for the array from host computers, and responsively generates disk commands for each of the disks. Some commands specify host computer user data, and others specify internally generated redundancy data. The controller executes coalescer code that maintains the commands on a queue for each disk. Whenever a disk completes a command, the coalescer determines whether there are two or more commands on the disk's queue that have the same read/write type and specify adjacent locations on the disk, and if so, coalesces them into a single command, and issues the coalesced command to the disk. The coalescer immediately issues a received command, rather than queuing it, if the number of pending commands to the disk is less than a maximum command depth, which may be different for each disk.

42 Claims, 8 Drawing Sheets

COMMAND-COALESCING RAID CONTROLLER

CROSS REFERENCE TO RELATED APPLICATION(S)

This application claims the benefit of the following Provisional U.S. Patent Application, which is hereby incorporated by reference in its entirety for all purposes:

| Ser. No. (Docket No.) | Filing Date | Title |
|---|---|---|
| 60/650,720 (CHAP.0122) | Feb. 7, 2005 | BACK-END IO COALESCER FOR A RAID CONTROLLER |

FIELD OF THE INVENTION

The present invention relates in general to the field of RAID controllers, and particularly to improved disk I/O performance thereby.

BACKGROUND OF THE INVENTION

Redundant Array of Inexpensive Disk (RAID) systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller controls a group of multiple physical disks in such a manner as to present a single logical disk (or multiple logical disks) to a computer operating system. RAID controllers employ the techniques of data striping and data redundancy to increase performance and data availability.

Although the techniques of RAID can provide marked performance improvements, the underlying performance of transfers with the physical disks themselves is still crucial to the overall performance of an array of disks. A disk drive includes one or more platters that store the data. The platters are laid out in tracks, which are each subdivided into sectors, or blocks. The platters are spun at high speed by a motor. The disk drive also includes a head for each platter that is capable of reading and writing data. The head is at the end of an arm that swings across the platter until it reaches the desired track. Disk performance is determined predominantly by four components: command overhead, seek time, rotational latency, and data transfer time. The command overhead is the time required for the RAID controller to transmit the command to the disk and for the disk to transmit a completion to the RAID controller. The command overhead also includes the time required by the disk to process the command. The seek time is the time required for the arm to swing to the desired track. The rotational latency is the time required for the disk platters to spin around such that the disk block, or sector, to be read or written on the desired track is under the head, which is predominantly a function of the rotational speed of the platters. The data transfer time is the time required to transfer the data to or from the disk, which is predominantly a function of the amount of data to be transferred and the data transfer rate between the disk and RAID controller and may also be a function of the data transfer rate to/from the disk recording media.

Streams of disk commands from a RAID controller to a disk, at least for relatively short periods, may typically be characterized as sequential in nature or random in nature. Random command streams are characterized by commands that specify disk blocks that are not sequential in nature. That is, the disk blocks do not lie on the same track thereby requiring some seek time; or, if on the same track, they are not adjacent to one another on the track thereby requiring some rotation time. Random commands also tend to specify relatively small amounts of data. Examples of systems that might receive highly random command streams are file servers, mail servers, transactional database servers, and the like. Thus, the performance of random command streams is dominated by seek time and/or rotational latency. The RAID notion of striping across multiple physical disks can significantly reduce the seek time penalty by enabling multiple heads on multiple physical disks to seek in parallel.

Sequential command streams are characterized by commands that specify disk blocks that are relatively adjacent and require little seeking. An example of an application program that might generate highly sequential read command streams are streaming video or audio applications in which enormous amounts of data are sequentially stored onto the disks and which are read in sequential order from the disks. The performance of highly sequential read command streams is largely dominated by data transfer time, as long as the disk includes a reasonable read cache. Conversely, a data acquisition system that captures large amounts of real time data, for example, might generate a highly sequential write command stream.

The performance of highly sequential write command streams was historically dominated by rotational latency as explained by the following example. First, the controller writes a command worth of data to the disk, which the disk writes to the media and then returns completion status to the controller. Next, the controller writes another command worth of data to the disk which is sequential with, or adjacent to, the data of the previous command. However, because the disk platter rotated some during the command overhead time, the target sector on the platter, which is adjacent to the last sector of the previous write command, has passed the location of the write head. Hence, a rotation time, or at least a portion of a rotation time, must be incurred to wait for the media to rotate such that the specified sector is under the head. The incurred rotation time may greatly reduce write performance. In particular, the severity of the impact on performance is largely a function of the length of the data transfer. That is, if only a relatively small of amount of data is written each rotation time, then the aggregate data transfer rate will be substantially worse than if a relatively large amount of data is written each rotation time.

One innovation that has improved sequential write performance is what is commonly referred to as command queuing. A command queuing disk is capable of receiving multiple outstanding commands. Thus, the command overhead may be largely, if not completely hidden. Using the example above, the controller may issue the second write command and transfer the data for the second write command to the disk while the disk is writing the data for the first write command to the media. Thus, once the disk has written the first data it may immediately begin writing the second data, which is sequential to the first data, while the write head is still in the desired location, since the second data has already been written to the disk by the controller. Hence, typically in a command queuing situation, as long as the controller can provide data to the drive at the disk media rate, no rotational latencies will be incurred, and the stream of data may be transferred at effectively the disk media rate.

However, some disks do not support command queuing. In particular, it has been noted by the present inventor that a significant number of SATA and SAS disks do not currently support command queuing, resulting in poor sequential write performance. These disks are particularly desirable in RAID controller applications because they are relatively inexpensive and because they have a serial interface, which is an advantage in environments in which disks are densely packed, such as in many RAID environments.

One way to reduce the negative impact on performance caused by this problem is to increase the RAID stripe size so that the length of a typical write command to a drive is relatively large. However, increasing the stripe size also has the detrimental affect of potentially drastically reducing performance during predominantly random command streams, since the large stripe size typically offsets the beneficial effect striping has on hiding seek time.

One technique that has been employed by device drivers in host computers to improve sequential write performance is command coalescing. The device drivers take multiple write requests that are sequential, or adjacent, to one another, and combine them into a single write request. By doing this, the device drivers effectively increase the average write request size, which as described above, ameliorates the negative effect of incurring a rotational latency in highly sequential write command streams. An example of a device driver in an operating system that coalesces sequential operations is described in U.S. Pat. No. 5,522,054.

However, a device driver in an operating system accessing logical disks controlled by a RAID controller only has visibility to user data and logical disks, but does not have visibility to coalesce writes of redundancy data (i.e., parity data or mirror data) to redundant drives (i.e., parity drives or mirror drives). Thus, command coalescing at the device driver level cannot address the performance problems described above. Therefore what is needed is a RAID controller that performs command coalescing.

BRIEF SUMMARY OF INVENTION

The present invention provides a command coalescing RAID controller.

In one aspect, the present invention provides a redundant array of inexpensive disks (RAID) controller for efficiently transferring data with a redundant array of physical disks. The controller includes a memory, for storing for each of the physical disks a queue of commands to issue to the physical disk. A portion of the commands in the queues specify user data specified by a host computer to be transferred with the physical disks, and a portion of the commands specify redundancy data generated by the RAID controller to be transferred with the physical disks. The controller also includes a processor, coupled to the memory, which executes coalescer code. The coalescer code receives command completions from the physical disks, and in response, for each of the physical disks, coalesces into a single command two or more of the commands in the queue that have a same read/write type and specify adjacent locations on the physical disk, and issues to the physical disk the single coalesced command.

In another aspect, the present invention provides a method for efficiently transferring data with a redundant array of physical disks controlled by a redundant array of inexpensive disks (RAID) controller. The method includes maintaining for each of the physical disks a queue of commands to issue to the physical disk. A portion of the commands in the queues specify user data, and a portion of the commands specify redundancy data. The method also includes receiving command completions from the physical disks, and in response, for each of the physical disks, coalescing into a single command two or more of the commands in the queue that are adjacent and have a same read/write type, and issuing to the physical disk the single coalesced command.

In another aspect, the present invention provides a redundant array of inexpensive disks (RAID) controller for efficiently writing to a redundant array of physical disks comprising a logical disk. The controller includes a memory and a CPU, coupled to the memory. The CPU receives from a host computer a plurality of I/O requests, each specifying user data to be written to the logical disk. The CPU also generates parity data from the user data and stores the parity data in the memory. The CPU also generates a first plurality of disk commands, each specifying a portion of the user data to be written to one of the physical disks in the redundant array. The CPU also generates a second plurality of disk commands, each specifying a portion of the parity data to be written to one of the physical disks in the redundant array. The CPU also accumulates into a list for each of the physical disks of the redundant array the first and second plurality of disk commands specifying the respective physical disk. The CPU also, for each of the lists, coalesces two or more adjacent ones of the disk commands in the list into a single disk command, and issues each of the single disk commands to the respective physical disk, rather than individually issuing the commands in the lists to the physical disks.

In another aspect, the present invention provides a method for improving the performance of a redundant array of inexpensive disks (RAID) controller to write data to a redundant array of physical disks comprising a logical disk. The method includes receiving from a host computer a plurality of I/O requests, each specifying user data to be written to the logical disk. The method also includes responsively generating parity data from the user data. The method also includes responsively generating a first plurality of disk commands. Each of the first plurality of disk commands specifies a portion of the user data to be written to one of the physical disks in the redundant array. The method also includes generating a second plurality of disk commands, after generating the parity data. Each of the second plurality of disk commands specifies a portion of the parity data to be written to one of the physical disks in the redundant array. The method also includes accumulating into a list for each of the physical disks of the redundant array the first and second plurality of disk commands specifying the respective physical disk. The method also includes, for each of the lists, coalescing two or more adjacent ones of the disk commands in the list into a single disk command, after the accumulating, and issuing each of the single disk commands to the respective physical disk, rather than individually issuing the commands in the lists to the physical disks.

In another aspect, the present invention provides a method for improving the performance of a redundant array of inexpensive disks (RAID) controller to write data to a redundant array of physical disks comprising a logical disk. The method includes receiving from a host computer a plurality of I/O requests, each specifying user data to be written to the logical disk. The method also includes responsively generating a first plurality of disk commands. Each of the first plurality of disk commands specifies a portion of the user data to be written to one of the physical disks in the redundant array. The method also includes generating a second plurality of disk commands, after generating the parity data. Each of the second plurality of disk commands specifies a portion of mirror data of the user data to be written to one of the physical disks in the redundant array. The method also includes accumulating into a list for each of the physical disks of the redundant array the first and second plurality of disk commands specifying the respective physical disk. The method also includes, for each of the lists, coalescing adjacent ones of the disk commands in the list into a single disk command, after the accumulating, and issuing each of the single disk commands to the respective physical disk, rather than individually issuing the commands in the lists to the physical disks.

In another aspect, the present invention provides a method for improving the performance of a redundant array of inexpensive disks (RAID) controller to read data from a redundant array of physical disks comprising a logical disk, wherein one of the physical disks in the array has failed causing a portion of the data to be unavailable on the failed disk. The method includes receiving from a host computer a plurality of I/O requests, each specifying user data to be read from the logical disk. The method also includes generating a first plurality of disk commands, in response to the receiving. Each of the first plurality of disk commands specifies a portion of the user data to be read from one of the physical disks in the redundant array. The method also includes responsively generating a second plurality of disk commands. Each of the second plurality of disk commands specifies a portion of parity data to be read from one of the physical disks in the redundant array. The method also includes accumulating into a list for each of the physical disks of the redundant array the first and second plurality of disk commands specifying the respective physical disk. The method also includes, for each of the lists, coalescing adjacent ones of the disk commands in the list into a single disk command, after the accumulating, and issuing each of the single disk commands to the respective physical disk, rather than individually issuing the commands in the lists to the physical disks. The method also includes receiving the user data and the parity data, in response to the issuing.

An advantage of the present invention is that it potentially improves disk I/O performance, particularly on physical disks that do not internally coalesce commands, that do not allow command queuing, and/or that do not command queue deeply enough to effectively enjoy the benefits of coalescing commands. Additionally, even for physical disks that effectively command queue and coalesce, the present invention potentially reduces the number of commands that must be issued to the physical disk to accomplish a given amount of data transfer. The decrease in the number of commands potentially increases the response time by reducing the command overhead. The decrease in the number of commands also potentially increases the bandwidth on the media (e.g., Fibre Channel or SAS link, SCSI bus, SATA cable) available for data transfer, and may also increase the bandwidth of the RAID controller CPU for processing I/O requests.

DETAILED DESCRIPTION

Figure 1:
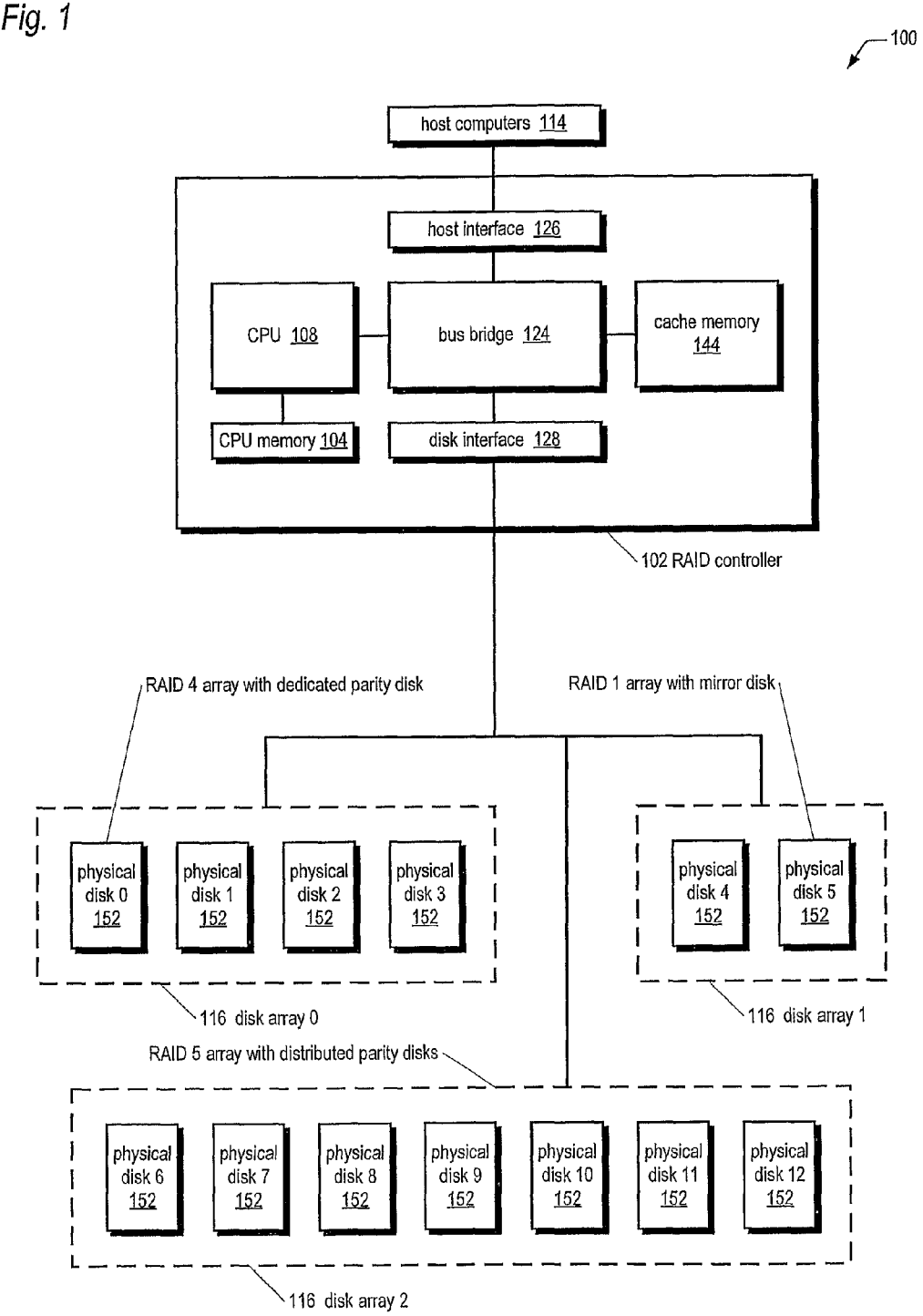
FIG. 1 is a block diagram illustrating a computing system including a RAID controller according to the present invention.

Referring now to FIG. 1, a block diagram illustrating a computing system 100 including a redundant array of inexpensive disks (RAID) controller 102 according to the present invention is shown. The system 100 includes one or more host computers 114 coupled to the RAID controller 102. The system also includes one or more disk arrays 116 coupled to the RAID controller 102. FIG. 1 illustrates three disk arrays 116 coupled to the RAID controller 102. One of the three disk arrays 116 is a RAID level 1 (mirrored) disk array 116 comprising two physical disks 152, one is a RAID level 4 (striped with dedicated parity disk) disk array 116 comprising four physical disks 152, and one is a RAID level 5 (striped with rotated, or distributed, parity disk) disk array 116 comprising seven physical disks 152. Although FIG. 1 illustrates thirteen physical disks 152, the present invention is not limited to a particular number of physical disks 152, but rather may be adapted to accommodate any number of physical disks 152 supportable by the physical connection medium, such as Fibre Channel, SATA, SCSI, or SAS. Although FIG. 1 illustrates disk arrays 116 of RAID levels 1, 4, and 5, the present invention is not limited to these RAID levels, but may be employed with any RAID levels, such as RAID levels 0, 2, 3, 10, 50, etc., all of which are well-known in the art of RAID technology. Each of the disk arrays 116 appear as one or more logical disks to the host computers 114. That is, a disk array 116 may appear as a single logical disk, or may be partitioned to appear as multiple logical disks to the host computers 114.

The RAID controller 102 includes a CPU 108, or processor 108, or CPU complex 108. The CPU 108 may be any processor capable of executing stored programs, including but not limited to, for example, a processor and chipset, such as an x86 architecture processor and what are commonly referred to as a North Bridge or Memory Control Hub (MCH) and a South Bridge or I/O Control Hub (ICH), which includes I/O bus interfaces, such as an interface to an ISA bus or a PCI-family bus. In one embodiment, the CPU complex 108 comprises a Transmeta TM8800 processor that includes an integrated North Bridge and an Acer Labs ALi M1563S South Bridge. In another embodiment, the CPU 108 comprises an AMD Elan SC-520 microcontroller. In another embodiment, the CPU 108 comprises an Intel Celeron M processor and an MCH and ICH.

Coupled to the CPU 108 is random access memory (RAM) 104, or CPU memory 104, from which the CPU 108 fetches and executes stored programs. In one embodiment, the CPU memory 104 comprises a double-data-rate (DDR) RAM, and the CPU 108 is coupled to the DDR RAM 104 via a DDR bus, which may be presented by a North Bridge or MCH, for example.

Also coupled to the CPU 108 is a bus bridge 124. In one embodiment, the CPU 108 and bus bridge 124 are coupled by a local bus, such as a PCI, PCI-X, PCI-Express, or other PCI family local bus. Coupled to the bus bridge 124 are a cache memory 144, a host interface 126, and a disk interface 128. In one embodiment, the cache memory 144 comprises a DDR RAM coupled to the bus bridge 124 via a DDR bus. In one embodiment, the host interface 126 and disk interface 128 comprise PCI-X or PCI-Express devices coupled to the bus bridge 124 via respective PCI-X or PCI-Express buses. The cache memory 144 is used to buffer and cache user data as it is transferred between the host computers 114 and disk arrays 116 via the host interface 126 and disk interface 128, respectively.

The disk interface 128 interfaces the RAID controller 102 to the disk arrays 116. The disk arrays 116 comprise disk drives or other mass storage devices, including but not limited to, tape drives, solid-state disks (SSD), and optical storage devices, such as CDROM or DVD drives. The disk arrays 116 store user data. The disk interface 128 may include, but is not limited to, the following interfaces: Fibre Channel, Small Computer Systems Interface (SCSI), Advanced Technology Attachment (ATA), Serial Attached SCSI (SAS), Serial Advanced Technology Attachment (SATA), SATA-II, Infiniband, HIPPI, ESCON, iSCSI, or FICON. The RAID controller 102 reads and writes data from or to the disk arrays 116 in response to I/O requests received from host computers 114. The disk interface 128 is coupled to the bus bridge 124 via a local bus, such as a PCI, PCI-X, PCI-Express, or other PCI family local bus.

The host interface 126 interfaces the RAID controller 102 with the host computers 114. In one embodiment, the RAID controller 102 is a local bus-based controller, such as a controller that plugs into, or is integrated into, a local I/O bus of the host computer system 114, such as a PCI, PCI-X, CompactPCI, PCI-Express, PCI-X2, EISA, VESA, VME, RapidIO, AGP, ISA, 3GIO, HyperTransport, Futurebus, MultiBus, or any other local bus. In this type of embodiment, the host interface 126 comprises a local bus interface of the local bus type. In another embodiment, the RAID controller 102 is a standalone controller in a separate enclosure from the host computers 114 that issue I/O requests to the RAID controller 102. For example, the RAID controller 102 may be part of a storage area network (SAN). In this type of embodiment, the host interface 126 may comprise various interfaces such as Fibre Channel, Ethernet, InfiniBand, SCSI, HIPPI, Token Ring, Arcnet, FDDI, LocalTalk, ESCON, FICON, ATM, SAS, SATA, iSCSI, and the like. The host interface 126 is coupled to the bus bridge 124 via a local bus, such as a PCI, PCI-X, PCI-Express, or other PCI family local bus.

The CPU 108, host interface 126, and disk interface 128, read and write data from and to the cache memory 144 via the bus bridge 124. The CPU 108 fetches and executes instructions of programs stored in the CPU memory 104 that control the transfer of data between the disk arrays 116 and the hosts 114. The CPU 108 receives commands from the hosts 114 to transfer data to or from the disk arrays 116. In response, the CPU 108 issues commands to the disk interface 128 to accomplish data transfers with the disk arrays 116. Additionally, the CPU 108 provides command completions to the hosts 114 via the host interface 126. The CPU 108 may also perform storage controller functions such as RAID control, logical block translation, buffer management, and data caching. In particular, the CPU 108 executes, among others, stored program code illustrated in FIG. 2.

Figure 2:
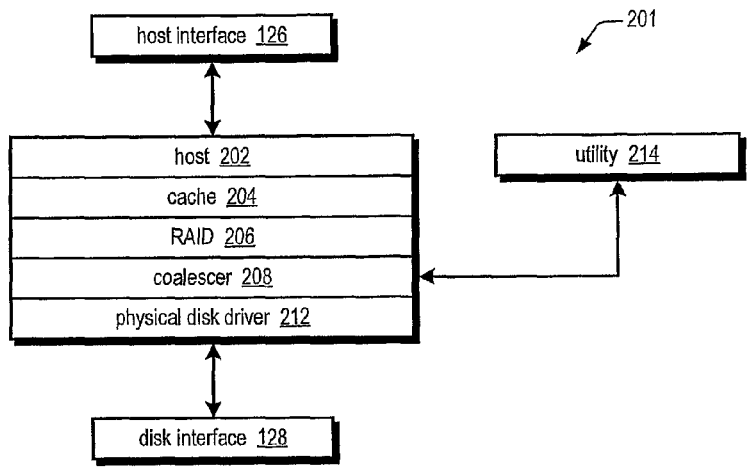
FIG. 2 is a block diagram illustrating program code executed by the CPU of FIG. 1 according to the present invention.

Referring now to FIG. 2, a block diagram illustrating program code 201, or firmware 201, executed by the CPU 108 of FIG. 1 according to the present invention is shown. The program code 201 includes host code 202. The host code 202 controls the host interface 126 of FIG. 1 to receive I/O requests and user data from the host computers 114 and to provide user data and I/O request completion status to the host computers 114. The I/O requests specify a target logical disk, which is one of the disk arrays 116, or a partition of one of the disk arrays 116. The I/O requests also specify the locations, or addresses, on the logical disk and the length of the data to be read or written from or to the logical disk.

The program code 201 also includes cache code 204. The cache code 204 manages the allocation of cache buffers in the cache memory 144, which serve as both a read cache and a write cache. When the host code 202 receives a read I/O request from a host computer 114, the host code 202 requests the data specified by the I/O request from the cache code 204. If the specified data is present in the cache memory 144 buffers, then the cache code 204 returns the data without reading from the disk array 116; otherwise, the cache code 204 allocates cache buffers for the data and requests the RAID code 206 to read the specified data from the disk array 116 specified by the I/O request into the allocated cache buffers. When the host code 202 receives a write I/O request from a host computer 114, the host code 202 requests the cache code 204 to write the specified data to the specified disk array 116. If the cache code 204 is configured in write-through mode, then the cache code 204 immediately requests the RAID code 206 to write the data to the disk array 116 and does not notify the host code 202 that the data has been written until the data has actually been written to the physical disks 152 of the disk array 116. However, if the cache code 204 is configured in write-back mode, then the cache code 204 delays requesting the RAID code 206 to write the data to the disk array 116 until an opportune time, such as when the data needs to be evicted from the cache buffer so that the cache buffer can be re-allocated to other data. In write-back mode, the cache code 204 immediately notifies the host code 202 that the data has been written, even though the data has not actually been written to the physical disks 152 of the disk array 116. In one embodiment, the RAID controller 102 is one of a redundant pair of RAID controllers 102, and when in write-back mode the cache code 204 does not notify the host code 202 that the data has been written until a mirror copy of the data has also been written to the other RAID controller 102 in the redundant pair to reduce the likelihood of loss of write-cached data. Additionally, in one embodiment, the RAID controller 102 includes battery backup capability to reduce the likelihood of loss of write-cached data. In one embodiment, the RAID controller 102 also includes non-volatile memory, such as compact FLASH memory, to which the RAID controller 102 writes the write-cached data from the cache memory 144 while under battery power in the event of a main power loss to further reduce the likelihood of loss of write-cached data.

The RAID code 206 performs the RAID functions, such as striping, mirroring, and parity operations, such as parity data generation and reconstruction of unavailable user data from parity data and remaining user data, which are well-known in the art of RAID technology. The RAID code 206 performs the various required logical block translations, such as determining which physical disks 152 are implicated by a request for a logical disk of the disk arrays 116, and translating disk block addresses specified for the logical disk into disk addresses for the implicated physical disks 152, as is well-known in the art of RAID technology. In response to receiving from the cache code 204 a request to read or write data from or to a logical disk, the RAID code 206 performs the necessary RAID functions to generate one or more disk commands to the implicated physical disks 152, which the RAID controller 102 sends to the coalescer code 208.

The coalescer code 208, or coalescer 208, is a layer of code added to the RAID controller 102 firmware 201 according to the present invention, which was not present in previous designs of the RAID controller 102. That is, in conventional implementations, the RAID code 206 issued its requests directly to the physical disk driver 212. However, advantageously, the coalescer 208 has been inserted in the firmware layer stack 201 to perform the function of coalescing multiple physical disk commands for a physical disk 152 into a single disk command in order to improve performance of the RAID controller 102. Advantageously, the coalescer 208 is configured to coalesce all disk commands for a physical disk 152, including disk commands that specify user data and disk commands that specify redundancy data, which is possible since the coalescer 208 is a central receptacle of both user data and redundancy data disk commands near the back-end of the firmware stack 201. The operation of the coalescer 208 will be described in detail below.

The physical disk driver 212 receives from the coalescer 208 disk commands for the physical disks 152, which may be coalesced disk commands, and issues the disk commands to the physical disks 152. Conversely, the physical disk driver 212 receives completions of the disk commands from the physical disks 152 and notifies the coalescer 208 of the completions. The physical disk driver 212 controls the disk interface 128 of FIG. 1 to transfer user data and redundancy data between the physical disks 152 and the cache memory 144 based on the disk commands received from the coalescer 208. In one embodiment, the physical disk driver 212 comprises multiple layers that perform various functions described herein. In one embodiment, the physical disk driver 212 maps disk commands in a generic disk command format to SCSI disk commands. In one embodiment, the firmware 201 includes a layer of code that supports SCSI commands to types of storage devices other than disks, such as tape drives, CDROM drives, etc. In one embodiment, the firmware 201 also includes a layer of code that converts SCSI commands into commands for other device interfaces, including but not limited to, SATA and SAS. Additionally, the physical disk driver 212 may perform some error handling of disk commands, such as retrying failed or timed out requests, or remapping bad disk sectors.

The program code 201 also includes utility code 214. The utility code 214 comprises various utility threads 214, or programs, that perform functions not directly related to servicing of I/O requests from the host computers 114. For example, the utility threads 214 may include a RAID 5 parity check utility, a disk array 116 scrub utility, and a disk array 116 reconstruct utility, or rebuild utility, which are described below with respect to FIG. 3. The utility code 214 interacts with the coalescer 208. In particular, the utility code 214 may submit disk commands to the coalescer 208. Additionally, the utility code 214 may query the coalescer 208 for activity level information regarding the physical disks 152, such as the host command type count 312 and non-host command type count 314, which are described below with respect to FIG. 3 and in a manner described with respect to the other Figures, and in particular with respect to FIG. 9.

Figure 3:
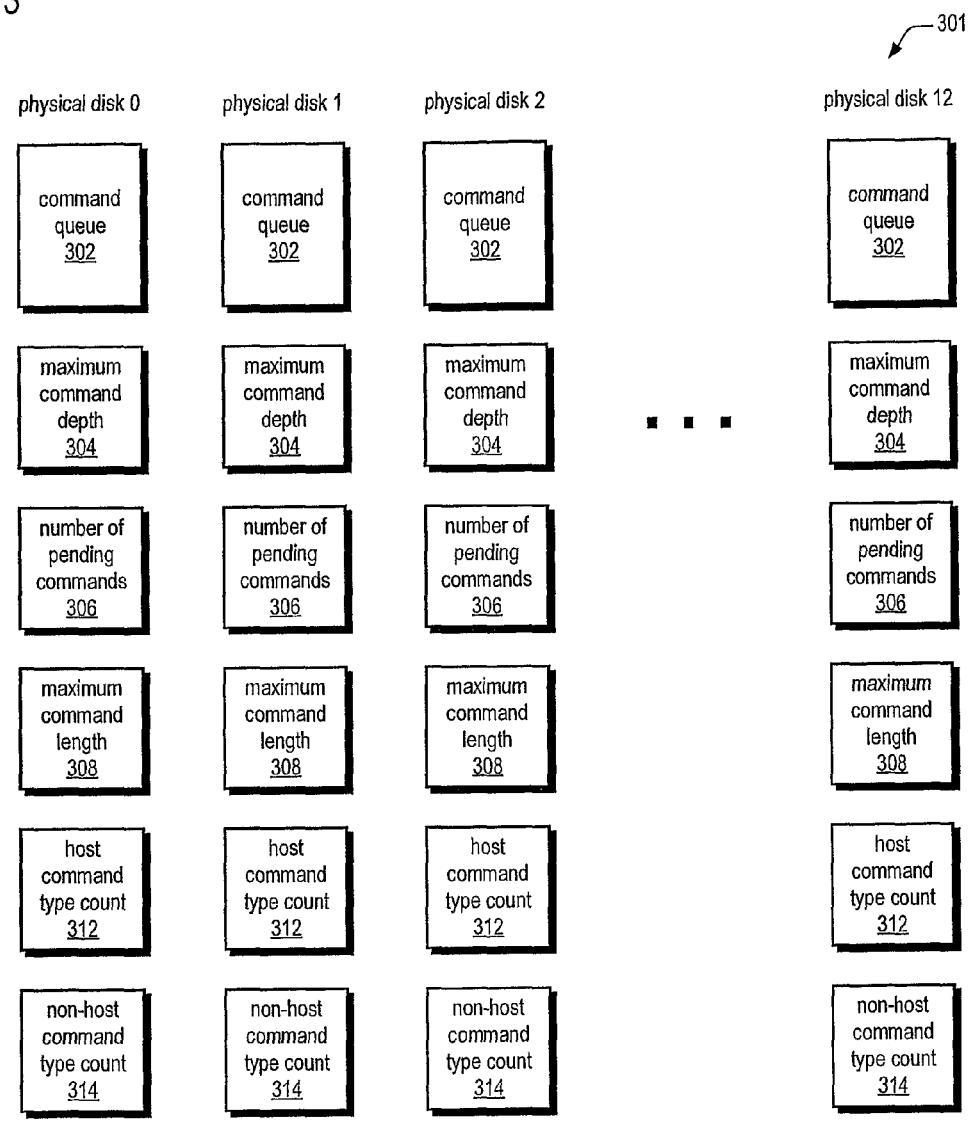
FIG. 3 is a block diagram illustrating data structures maintained by the coalescer of FIG. 2 for each of the physical disks of FIG. 1 according to the present invention.

Referring now to FIG. 3, a block diagram illustrating data structures 301 maintained by the coalescer 208 of FIG. 2 for each of the physical disks 152 of FIG. 1 according to the present invention is shown. The data structures 301 include a command queue 302, a maximum command depth 304, a number of pending commands 306, a maximum command length 308, a host command type count 312, and a non-host command type count 314.

The command queue 302 is a queue of disk commands received from the RAID code 206. In one embodiment, the coalescer 208 places the disk commands received from the RAID code 206 onto the command queue 302 in the order received, thus maintaining temporal order of the disk commands.

The maximum command depth 304 indicates the maximum number of disk commands that the coalescer 208 will allow to be outstanding to the physical disk 152 at a time. That is, once the coalescer 208 has issued the maximum command depth 304 of disk commands to the physical disk driver 212, the coalescer 208 will not issue another disk command to the physical disk driver 212 until the physical disk driver 212 has returned a completion for one of the outstanding disk commands. Advantageously, the coalescer 208 maintains the maximum command depth 304 in order to improve the performance of data transfers between the physical disks 152 and the RAID controller 102. In one embodiment, the maximum command depth 304 value is determined empirically through laboratory testing for different types of physical disks 152 prior to deployment of the RAID controller 102. For example, the testing may reveal that a command depth beyond a particular value causes errors or results in lesser performance. It is noted that some physical disk 152 types do not currently support command queuing of multiple commands to the disk, whereas other physical disk 152 types do support command queuing. Furthermore, although some physical disk 152 types may support command queuing, it is noted that for some physical disk 152 types it may be more advantageous to performance to reduce the maximum command depth 304 below the maximum value supported by the physical disk 152 in favor of disk command coalescing. Table 1 below lists the maximum command depth 304 employed by the RAID controller 102 of the present invention for a list of different physical disk 152 types according to one embodiment.

TABLE 1

| disk type | maximum command depth | maximum command length |
| --- | --- | --- |
| Fibre Channel | 17 | 1 MB |
| SATA-1 | 1 | 64 KB |
| SAS | 8 | 512 KB |
| SATA Router | 2 | 1 MB |
| SATA-2 | 1 | 1 MB |
| Unknown | 16 | 1 MB |

The "SATA Router" entry in Table 1 indicates a configuration in which the disk interface 128 is a Fibre Channel interface that communicates with a Fibre Channel-to-SATA router, which in turn controls multiple SATA disks.

The number of pending commands 306 indicates the number of disk commands that the coalescer 208 has submitted to the physical disk driver 212 that have not yet completed, and which are presumed by the coalescer 208 to have been submitted to the physical disk 152 and not yet completed thereby. As described below, the coalescer 208 compares the number of pending commands 306 with the maximum command depth 304 for the physical disk 152 to determine whether to submit another disk command to the physical disk 152.

The maximum command length 308 indicates the largest amount of data that the coalescer 208 will specify in a single disk command to a physical disk 152. In one embodiment, the maximum command length 308 value is determined empirically through laboratory testing for different types of physical disks 152 prior to deployment of the RAID controller 102. For example, the testing may reveal that a command length beyond a particular value causes errors or results in lesser performance. Table 1 lists the maximum command length 308 for a list of different physical disk 152 types according to one embodiment.

It is noted that although an embodiment is described in which the maximum command depth 304 and maximum command length 308 are determined empirically through experimentation, they may be determined by other methods. For example, an embodiment is contemplated in which the maximum command length 308 and maximum command depth 304 are determined by issuing a command to the physical disk 152 which returns the requested information directly. Furthermore, although in the embodiment of Table 1 the physical disk 152 types are characterized by transfer media interface type, other embodiments are contemplated in which the physical disk 152 types are further characterized by manufacturer and model number, or even further characterized by physical disk 152 firmware revision.

The host command type count 312 indicates the number of disk commands in the command queue 302 for the physical disk 152 that are of a host command type, and the non-host command type count 314 indicates the number of disk commands in the command queue 302 for the physical disk 152 that are of a non-host command type. Broadly speaking, host command type commands are disk commands that are generated by the RAID controller 102 in response to an I/O request received from the host computers 114, and therefore involve the reading or writing of user data from or to the physical disks 152. In contrast, non-host command type commands are disk commands that are generated by the RAID controller 102 internally independent of host computer 114 I/O requests. For example, the RAID controller 102 may include code, such as the utility programs 214 of FIG. 2, to perform various tasks aside from the servicing of host computer 114 I/O requests. One example is a RAID 5 parity check utility, which generates disk commands to systematically read stripes of user and parity data from the physical disks 152 in an disk array 116, calculate the parity data for the stripe, and compare the calculated parity data with the parity data read from the physical disks 152 to verify that the data is correct. The disk commands generated by the RAID 5 parity check utility are of the non-host command type. Another example is a reconstruct utility, or rebuild utility, which is invoked when a physical disk 152 in a disk array 116 is replaced with a new physical disk 152. The reconstruct utility generates disk commands to read the data from the old physical disks 152 in the disk array 116, then calculates the data for the new physical disk 152, and then generates disk commands to write the calculated data to the new physical disk 152. The disk commands generated by the reconstruct utility are of the non-host command type. Another example is a scrub utility, which generates disk commands to read every addressable sector from the physical disks 152 of a disk array 116. If the scrub utility detects a media error on one of the physical disks 152 of a disk array 116, the scrub utility uses the redundancy data to repair the media error by reassigning the bad sector and re-writing the data to the reassigned sector. The disk commands generated by the scrub utility are of the non-host command type. It should be understood that not all disk commands that specify parity data are of the non-host command type; in particular, disk commands that are generated in response to a host computer 114 I/O request, even though they specify the writing or reading of parity data, are of the host command type. Similarly, disk commands that are generated in response to a host computer 114 I/O request, even though they specify mirror data, are of the host command type.

It is noted that although FIG. 2 shows the RAID code 206 and utility code 214 interfacing with the coalescer 208, other code within the firmware may also interface with the coalescer 208 to issue disk commands. The code that issues the disk command to the coalescer 208, whether it is the RAID code 206, utility code, or other code, indicates to the coalescer 208 the type of the disk command, i.e., host command type or non-host command type. In one embodiment, a disk command comprises a buffer data structure, similar to the UNIX struct buf, which also includes a type field. Listed here is a C language enumeration that specifies the possible values of the type field. As indicated by the enumeration, type field values above the RBT_NONHOSTIO_TYPE value are host command type commands and type field values below the RBT_NONHOSTIO_TYPE value are non-host command type commands. As may be observed, the enumeration includes a type field value for identifying the disk command as a coalesced disk command, as discussed in more detail below.

```
typedef enum
{
    RBT_UNKNOWN = 0,                              // Currently unallocated
    RBT_ARRAY_PART_SEGMENT,                       // Array Partition Segment strategy routine
    RBT_ARRAY_PARTITION,                          // Array Partition strategy routine
    RBT_CHIMIF,                                   // Used by CHIMIF to start requests from Cache.
    RBT_COALESCED_IO,                             // Non-mirrored write-thru sequential write
                                                  // coalesce
    RBT_DATA_LOG,                                 // Used for logging of Parity RAID writes
    RBT_DIRECT_IO,                                // Used for the Direct I/O driver interface.
    RBT_MIRROR_ACCESS,                            // Mirror RAID (R1) strategy routine
    RBT_MORPH_ACCESS,                             // Access to an array undergoing expansion.
    RBT_PARITY_RAID_BAD_LBA,                      // Reconstruct data for a bad LBA
    RBT_PARITY_RAID_FULL_STRIPE_WRITE_CHILD,      // Parity RAID (R3-R5) full stripe
                                                  // write child
    RBT_PARITY_RAID_CHILD,                        // Parity RAID (R3-R5) child (stripe/chunk level)
    RBT_PARITY_RAID_GR_CHILD,                     // Parity RAID grandchild (drive I/O level)
    RBT_PARITY_RAID_VERIFY,                       // Verify parity for a Parity RAID array
    RBT_SINGLE_SECTOR,                            // Single Sector I/O access
    RBT_STRIPE_ACCESS,                            // Stripe (RAID-0, RAID-10, RAID-50) access
    RBT_VOLUME_ACCESS,                            // Volume Set access
    RBT_NONHOSTIO_TYPE,                           // Keep all host IO related types before this
                                                  // and all non host IO types after this
    RBT_ZERO_WRITE,                               // Zero container write
    RBT_PARITY_RAID_SCRUB,                        // Scrub of a parity RAID data
    RBT_PARITY_RAID_SCRUB_TASK,                   // Parallel scrub of a RAID data (array mit)
    RBT_PARITY_RAID_REBUILD,                      // Parity RAID drive Rebuild
    RBT_VOLUME_SCRUB,                             // Scrub of Volume
```

```
    RBT_MIRROR_SCRUB,          // Scrub of Mirror RAID data
    RBT_MORPH_DATA_MOVE,       // Data movement for array expansion.
    RAID_MAX_BUF_TYPE          // Maximum number of buf types (always the last enum)
} RAID_BUF_TYPE;
```

Figure 4:
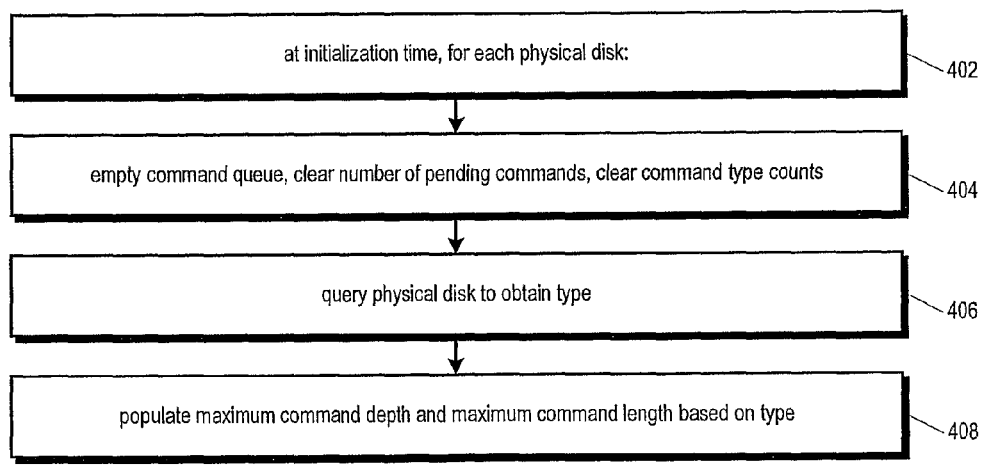
FIG. 4 is a flowchart illustration operation of the RAID controller to initialize the data structures of FIG. 3 according to the present invention.

Referring now to FIG. 4, a flowchart illustrating operation of the RAID controller 102 to initialize the data structures 301 of FIG. 3 according to the present invention is shown. Flow begins at block 402.

As indicated at block 402, the following steps are performed for each of the physical disks 152 of FIG. 1 at initialization time. Initialization time includes the time when the RAID controller 102 is booted up, and may also include when a new physical disk 152 is added, or connected, to the RAID controller 102. Flow proceeds to block 404.

At block 404, the firmware creates an empty command queue 302 of FIG. 3 and clears to zero the number of pending commands 306, host command type count 312, and non-host command type count 314 for the physical disk 152. Flow proceeds to block 406.

At block 406, the firmware queries the physical disk 152 to determine its type. In one embodiment, the initialization code issues a SCSI INQUIRY command to the physical disk driver 212. The physical disk driver 212 has knowledge of the interface with the physical disk 152, i.e., the physical media connection type and protocol, e.g., Fibre Channel, SAS, SATA, SATA-2, etc. The physical disk driver 212 issues a command to the physical disk 152 based on the interface. Thus, for example, if the interface is SCSI or SAS, the physical disk driver 212 issues a SCSI INQUIRY command to the physical disk 152, and if the interface is SATA or SATA-2, the physical disk driver 212 issues a SATA IDENTIFY DEVICE command. The physical disk driver 212 returns to the initialization code the information specifying the interface and information returned by the physical disk 152 itself in response to the command. Flow proceeds to block 408.

At block 408, the initialization code populates the maximum command depth 304 and maximum command length 308 values for the physical disk 152 based on the physical disk 152 type, i.e., on the information obtained at block 406. In one embodiment, the initialization code looks up the physical disk 152 type in a table, such as Table 1, to obtain the maximum command depth 304 and maximum command length 308. In another embodiment, the initialization code determines the maximum command depth 304 and maximum command length 308 based directly on information returned by the physical disk 152, as described above with respect to FIG. 3.

Figure 5:
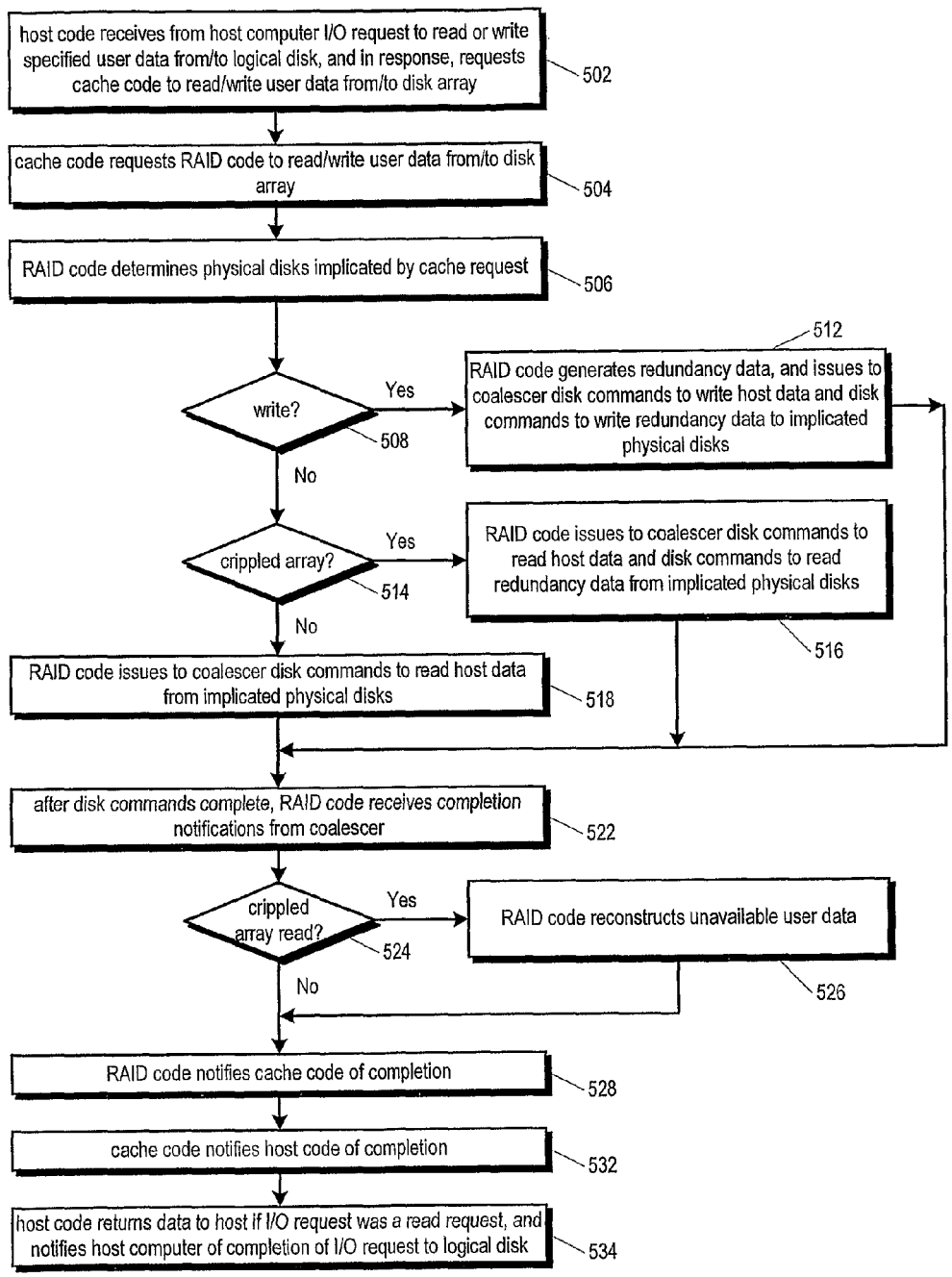
FIG. 5 is a flowchart illustrating operation of the RAID controller according to the present invention.

Referring now to FIG. 5, a flowchart illustrating operation of the RAID controller 102 according to the present invention is shown. Although FIG. 5 illustrates operation of the RAID controller 102 to process a single I/O request from a host computer 114, it should be understood that many such I/O requests are processed concurrently by the RAID controller 102. In particular, it should be understood that the coalescer 208 receives many disk commands from the RAID code 206, such as described below with respect to blocks 512, 516, and 518, so that the coalescer 208 may accumulate many disk commands for each physical disk 152, and the disk commands may specify user data and/or redundancy data. Flow begins at block 502.

At block 502, the host code 202 receives an I/O request from a host computer 114 to read/write user data from/to a logical disk, i.e., from a disk array 116 or partition thereof. In response, the host code 202 requests the cache code 204 to read/write the user data from/to the specified disk array 116. Flow proceeds to block 504.

At block 504, the cache code 204 requests the RAID code 206 to read/write the user data from/to the disk array 116. As discussed above, if the I/O request is a read request and the cache code 204 determines the requested user data is already present in the cache memory 144, the cache code 204 may immediately return the user data from the cache memory 144. However, for illustration purposes, FIG. 5 assumes the requested data is missing in the cache memory 144 in the case of a read request. As also discussed above, if the I/O request is a write request, the cache code 204 may perform a write-through or write-back (or posted write) mode operation with the user data. Flow proceeds to block 506.

At block 506, the RAID code 206 determines which of the physical disks 152 are implicated by the cache request. That is, the RAID code 206 determines which of the physical disks 152 are included in the specified disk array 116, and whether all or only some of the physical disks 152 in the disk array 116 includes blocks, or sectors, that the data is to be read/written from/to based on the RAID level, configuration, and so forth. Flow proceeds to decision block 508.

At decision block 508, the RAID code 206 determines whether the request is a write request. If so, flow proceeds to block 512; otherwise, flow proceeds to decision block 514.

At block 512, the RAID code 206 generates redundancy data. Redundancy data may be parity data or mirror data. Additionally, the RAID code 206 issues to the coalescer 208 disk commands to write the host data specified by the host I/O request and disk commands to write the redundancy data to the implicated physical disks 152. In the case of a parity type RAID level disk array 116, such as RAID levels 2 through 5, the RAID code 206 generates parity data. In the case of a mirror type RAID level disk array 116, the redundancy data is mirror data. In one embodiment, the mirror data is not separately generated, but rather duplicate disk commands point to a single copy of the user data, which is written twice—once to the primary physical disk 152 and once to the mirror physical disk 152, such as in a RAID 1 disk array 116. Flow proceeds to block 522.

At decision block 514, the RAID code 206 determines whether the read request is directed to a disk array 116 that is crippled, i.e., to a disk array 116 in which one of the physical disks 152 has failed. If so, flow proceeds to block 516; otherwise, flow proceeds to block 518.

At block 516, the RAID code 206 issues to the coalescer 208 disk commands to read the available portion of the host data and disk commands to read the available portion of the redundancy data from the implicated physical disks 152. For example, if the crippled disk array 116 is a RAID 5 array, then typically the RAID code 206 will read an entire stripe of data from each of the operational physical disks 152 in the disk array 116, i.e., the available user data and parity data, and reconstruct the data that is unavailable from the non-operational physical disk 152, in order to provide the unavailable data to the host computer 114. For another example, if the crippled disk array 116 is a RAID 1 array, the RAID code 206 will read the data from the remaining operational physical disk 152. Flow proceeds to block 522.

At block 518, the RAID code 206 issues to the coalescer 208 disk commands to read the host data from the implicated physical disks 152. That is, the RAID code 206 need not read the redundancy data, since all of the specified user data is available. It is noted that the disk commands issued by the RAID code to the coalescer 208 at blocks 512, 516, and 518 are host command type commands. Flow proceeds to block 522.

Figure 6:
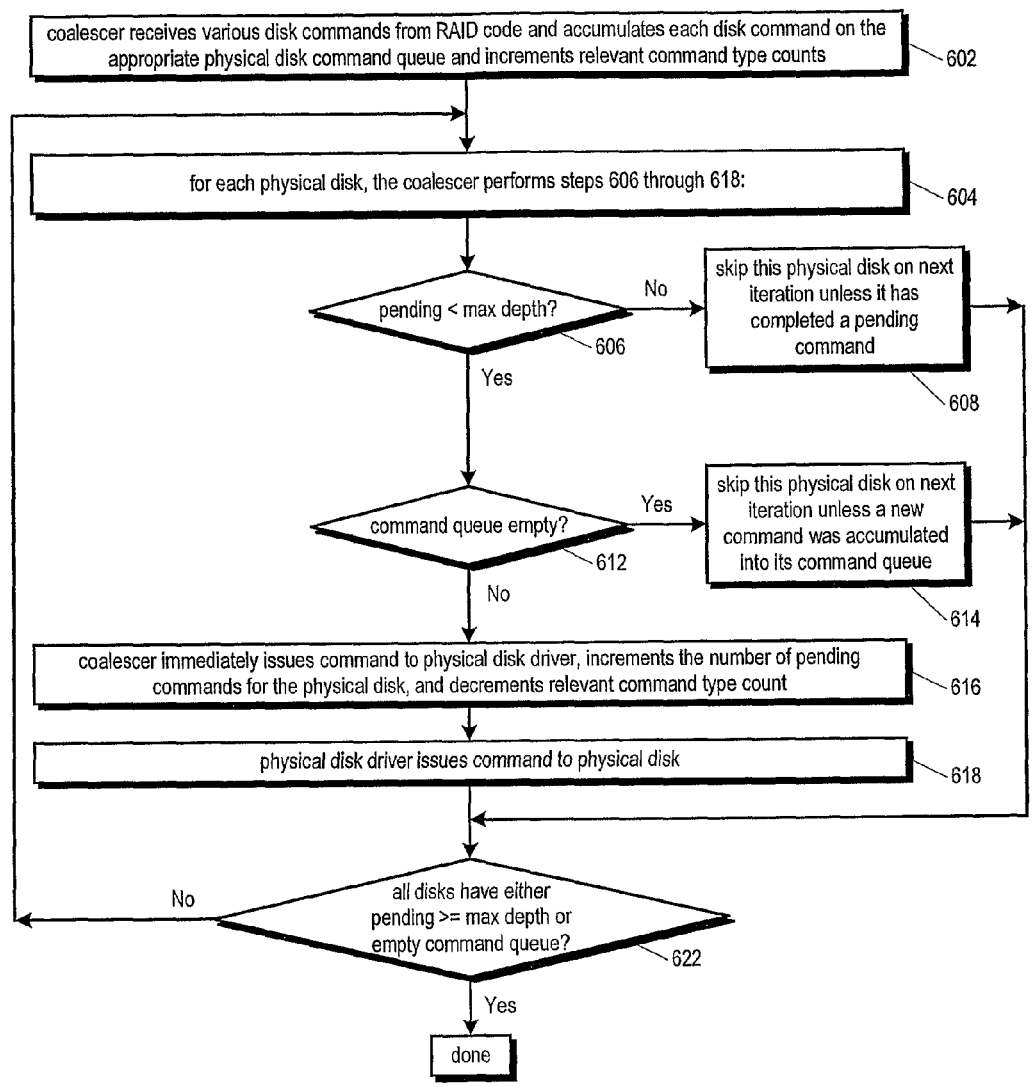
FIGS. 6 through 8 are flowcharts illustrating operation of the coalescer according to the present invention.
Figure 7:
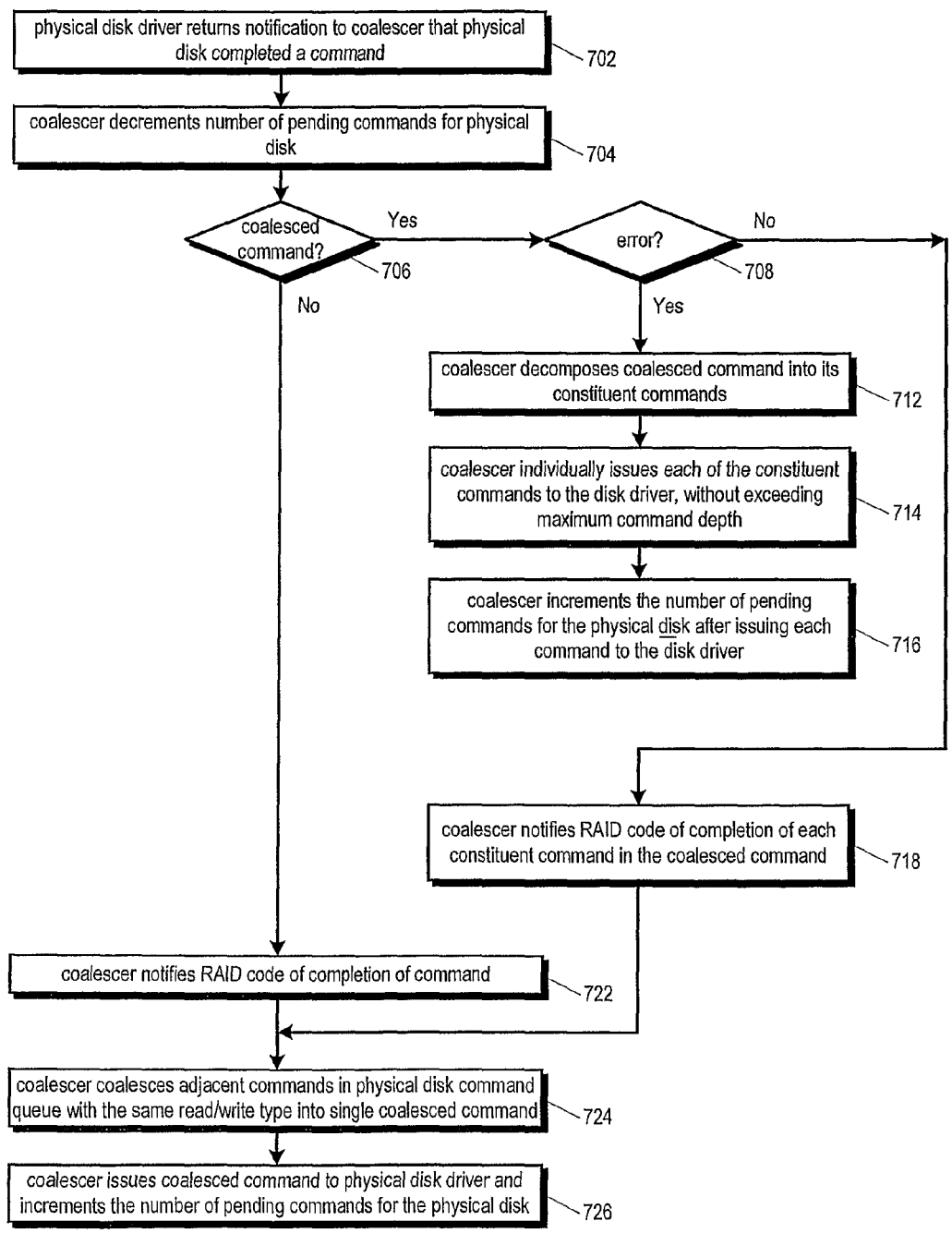
Figure 8:
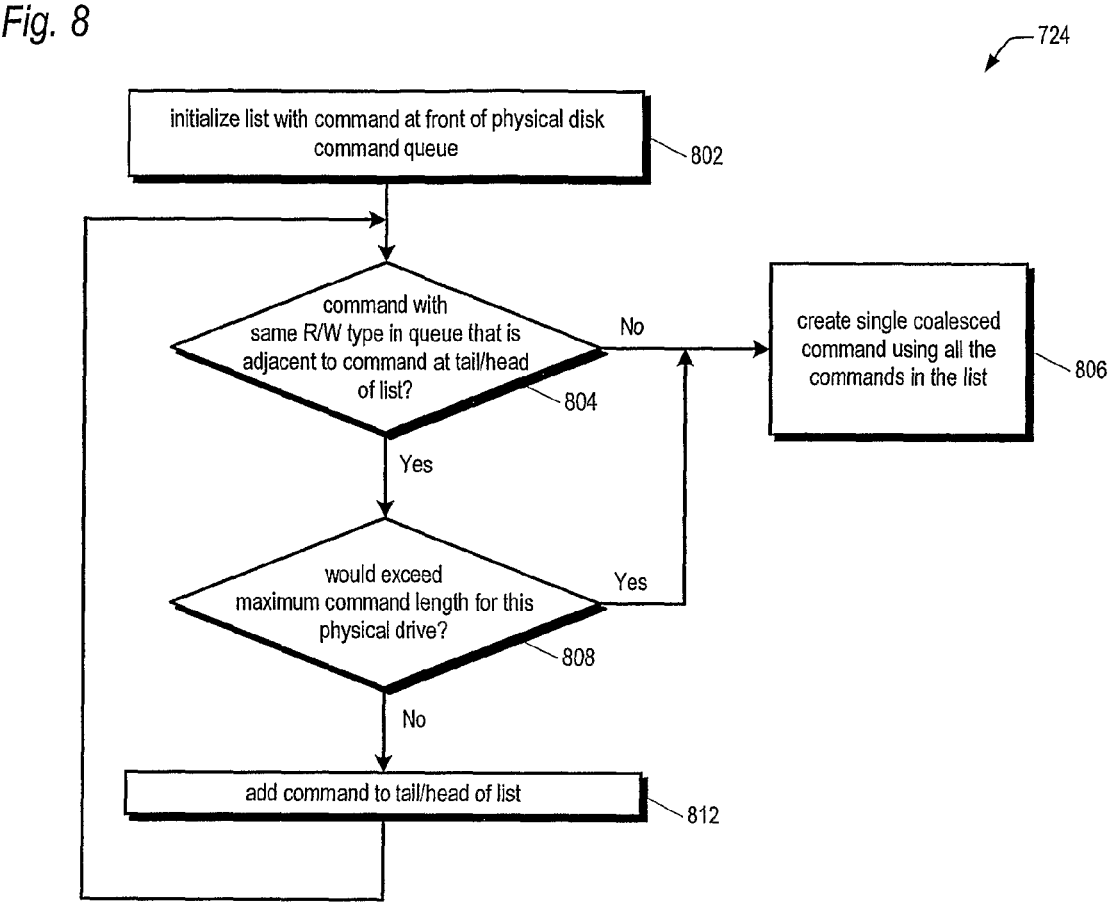

At block 522, the coalescer 208 has received the disk commands issued to it by the RAID code 206 at blocks 512, 516, or 518; has issued the disk commands to the physical disk driver 212, either as coalesced disk commands and/or as un-coalesced disk commands; the physical disk driver 212 has issued the disk commands to the physical disks 152; the physical disks 152 have either written or read the specified data and returned status to the physical disk driver 212; the physical disk driver 212 has notified the coalescer 208 of the completion status; and the coalescer 208 has sent completion notifications to the RAID code 206; all as discussed below with respect to FIGS. 6 through 8. Thus, the RAID code 206 receives from the coalescer 208 the completion notifications of the disk commands to the physical disks 152. Flow proceeds to decision block 524.

At decision block 524, the RAID code 206 determines whether the cache code 204 request received at block 504 was a read request destined for a crippled disk array 116. If so, flow proceeds to block 526; otherwise, flow proceeds to block 528.

At block 526, in the case of a crippled redundant array 116 (i.e., an array 116 that has a physical disk 152 that is not operational), the RAID code 206 reconstructs the data that is unavailable from the non-operational physical disk 152 using the data received from the operational physical disks 152 in the array 116, such as the data received in association with a completion returned to the RAID code 206 by the coalescer 208 at block 522. Flow proceeds to block 528.

At block 528, the RAID code 206 notifies the cache code 204 that the disk commands issued at blocks 512, 516, or 518 have completed, i.e., that the specified user data was read from the disk array 116 into the cache memory 144, or written from the cache memory 144 to the disk array 116, as requested. Flow proceeds to block 532.

At block 532, the cache code 204 notifies the host code 202 that the specified user data was read from the disk array 116 into the cache memory 144, or written from the cache memory 144 to the disk array 116, as requested. Flow proceeds to block 534.

At block 534, the host code 202 notifies the host computer 114 that the specified user data was transferred to the host computer 114, or written to the disk array 116, as requested. In the case of a host computer 114 read I/O request, the host code 202 causes the requested user data to be transferred from the cache memory 144 to the host computer 114 prior to notifying the host computer 114 of the I/O request completion. Flow ends at block 534.

Referring now to FIG. 6, a flowchart illustrating operation of the coalescer 208 according to the present invention is shown. In particular, the flowchart of FIG. 6 illustrates operation of the coalescer 208 to issue disk commands to the physical disk driver 212 in the process of servicing the command queues 302. Flow begins at block 602.

At block 602, the coalescer 208 receives from the RAID code 206 various disk commands, such as those described above with respect to FIG. 5 and/or from utility threads 214 as described herein. In response, the coalescer 208 accumulates the each disk command onto the command queue 302 for the specified physical disk 152. In one embodiment, the coalescer 208 accumulates the disk commands onto the command queue 302 in the order received. One advantage of this embodiment is that it guarantees that commands get issued in a fair manner, i.e., it avoids the possibility of a command sitting in the command queue 302 for a relatively long time because it is getting bypassed by other newer commands. Additionally, the coalescer 208 increments the host command type count 312 or non-host command type count 314 for the physical disk 152 based on the type of the disk command. Flow proceeds to block 604.

At block 604, for each physical disk 152, the coalescer 208 performs the steps at blocks 606 through 618. Flow proceeds to decision block 606.

At decision block 606, the coalescer 208 determines whether the number of pending commands 306 is less than the maximum command depth 304 for the physical disk 152. If so, flow proceeds to decision block 612; otherwise, flow proceeds to block 608.

At block 608, the physical disk 152 will be skipped on the next iteration, since the physical disk 152 has already reached the maximum command depth 304, unless the physical disk 152 completes a pending disk command in the mean time. Flow proceeds to decision block 622.

At decision block 612, the coalescer 208 determines whether the command queue 302 for the physical disk 152 is empty. If so, flow proceeds to block 614; otherwise, flow proceeds to block 616.

At block 614, the physical disk 152 will be skipped on the next iteration, since the physical disk 152 has an empty command queue 302, unless a new disk command was accumulated onto the physical disk 152 command queue 302 in the mean time. Flow proceeds to decision block 622.

At block 616, the coalescer 208 immediately issues the next disk command on the command queue 302 to the physical disk driver 212, since the number of pending commands 306 has not exceeded the maximum command depth 304. Additionally, the coalescer 208 increments the number of pending commands 306 for the physical disk 152. Still further, the coalescer 208 decrements either the host command type count 312 or non-host command type count 314 for the physical disk 152, depending upon the command type of the disk command issued to the physical disk driver 212. Advantageously, by immediately issuing the disk command to the physical disk driver 212 if the number of pending commands 306 is less than the maximum command depth 304, the coalescer 208 obtains the benefits of command coalescing without adding additional command overhead latency. Flow proceeds to block 618.

At block 618, the physical disk driver 212 issues the received disk command to the physical disk 152. Flow proceeds to decision block 622.

At decision block 622, the coalescer 208 determines whether all of the physical disks 152 have either an empty command queue 302 or number of pending commands 306 greater than or equal to maximum command depth 304. If so, flow ends; otherwise, flow returns to block 604.

Referring now to FIG. 7, a flowchart illustrating operation of the coalescer 208 according to the present invention is shown. In particular, the flowchart of FIG. 7 illustrates operation of the coalescer 208 when a physical disk 152 completes a disk command. Flow begins at block 702.

At block 702, the physical disk driver 212 returns a notification to the coalescer 208 that a physical disk 152 has completed a pending disk command. Flow proceeds to block 704.

At block 704, the coalescer 208 decrements the number of pending commands 306 for the physical disk 152 in response to the notification received from the physical disk driver 212. Flow proceeds to decision block 706.

At decision block 706, the coalescer 208 determines whether the completed disk command is a coalesced disk command. In one embodiment, the coalescer 208 determines whether the completed disk command is a coalesced disk command by determining whether the struct buf type field equals the RBT_COALESCED_IO value shown in the enumeration above. If so, flow proceeds to decision block 708; otherwise, flow proceeds to block 722.

At decision block 708, the coalescer 208 examines the completion status of the disk command to determine whether there was an error. If so, flow proceeds to block 712; otherwise, flow proceeds to block 718.

At block 712, the coalescer 208 decomposes the coalesced disk command into its constituent disk commands, i.e., the adjacent and like read/write type disk commands that were previously coalesced into a single disk command at block 724, as described in more detail with respect to FIG. 8. Flow proceeds to block 714.

At block 714, the coalescer 208 individually issues each of the constituent commands to the physical disk driver 212. That is, the coalescer 208 retries the constituent commands in a non-coalesced fashion. As the coalescer 208 issues the constituent commands to the physical disk driver 212, the coalescer 208 ensures that the maximum command depth 304 for the physical disk 152 is not exceeded. Flow proceeds to block 716.

At block 716, the coalescer 208 increments the number of pending commands 306 for the physical disk 152 after issuing each of the constituent commands to the physical disk driver 212. Flow ends at block 716.

At block 718, the coalescer 208 notifies the RAID code 206 of the successful completion of each of the constituent disk commands in the coalesced disk command. Flow proceeds to block 724.

At block 722, the coalescer 208 notifies the RAID code 206 that the disk command has completed. Flow proceeds to block 724.

At block 724, the coalescer 208 coalesces adjacent commands in the physical disk 152 command queue 302 that have the same read/write type into a single coalesced disk command, as described in more detail with respect to FIG. 8. That is, read commands are coalesced only with other read commands, and write commands are coalesced only with other write commands. Flow proceeds to block 726.

At block 726, the coalescer 208 issues the coalesced command created at block 724 to the physical disk driver 212 and increments the number of pending commands 306 for the physical disk 152. Flow ends at block 726.

Referring now to FIG. 8, a flowchart illustrating operation of the coalescer 208 to perform the step at block 724 of FIG. 7 according to the present invention is shown. Flow begins at block 802.

At block 802, the coalescer 208 creates a disk command list that includes only the disk command at the front of the physical disk 152 command queue 302. That is, the disk command at the front of the command queue 302 is initially at both the head and tail of the list. Flow proceeds to decision block 804.

At decision block 804, the coalescer 208 determines whether there is any other disk command in the command queue 302 for the physical disk 152 which is adjacent to and has the same read/write type as the disk command at the head or tail of the list that was created at block 802 and which has possibly been added to according to the step at block 812. If so, flow proceeds to decision block 808; otherwise, flow proceeds to block 806.

At block 806, the coalescer 208 creates a single coalesced disk command using all the disk commands in the list, i.e., the disk command list that was initialized at block 802 and potentially updated at block 812. In one embodiment, the coalescer 208 coalesces multiple disk commands into a single coalesced disk command by allocating a new disk command structure and assigning a pointer in the structure to point to the list of constituent disk commands that were coalesced into the single coalesced command. The new coalesced disk command structure specifies all of the disk blocks specified by the constituent disk commands. In particular, the starting disk block of the coalesced disk command specifies the lowest number disk block among the starting disk blocks specified among the constituent disk commands. The new coalesced disk command structure also specifies a number of disk blocks to transfer that is equal to the sum of the number of disk blocks specified by the constituent disk commands. A disk command A is adjacent to, or sequential to, a disk command B if command A specifies a disk block address that immediately follows in sequence the last disk block address specified by command B, or vice versa. For example, assume command A specifies the starting disk block is 301 and the number of blocks is 5, i.e., the last specified disk block is 305; and assume command B specifies the starting disk block is 306 and the number of blocks is 2. Then command B is adjacent to command A, since the first disk block address specified by command B immediately follows in sequence the last disk block address specified by command A. However, if command B specifies the starting disk block is 305 or 307, then command B is not adjacent to command A. Similarly, if command B specifies the starting disk block is 299 and the number of blocks is 2, then command B is adjacent to command A, since the first disk block address specified by command A immediately follows in sequence the last disk block address specified by command B. It should be understood that if the first time block 804 is executed there is no disk command in the command queue 302 which is adjacent to and has the same read/write type as the disk command at the front of the command queue 302, then no opportunity for coalescing is presented and the disk command at the front of the command queue 302 is simply returned to be issued individually, rather than as a coalesced disk command. Flow ends at block 806.

At decision block 808, the coalescer 208 determines whether adding the disk command determined at decision block 804 to the commands currently in the list would cause the maximum command length 308 for the physical disk 152 to be exceeded. If so, flow proceeds to block 806; otherwise, flow proceeds to block 812.

At block 812, the coalescer 208 adds the disk command determined at decision block 804 to the commands currently in the list. In particular, if the disk command is adjacent to the head disk command, then the coalescer 208 adds it to the head of the list; and if the disk command is adjacent to the tail disk command, then the coalescer 208 adds it to the tail of the list. Flow returns to decision block 804.

Figure 9:
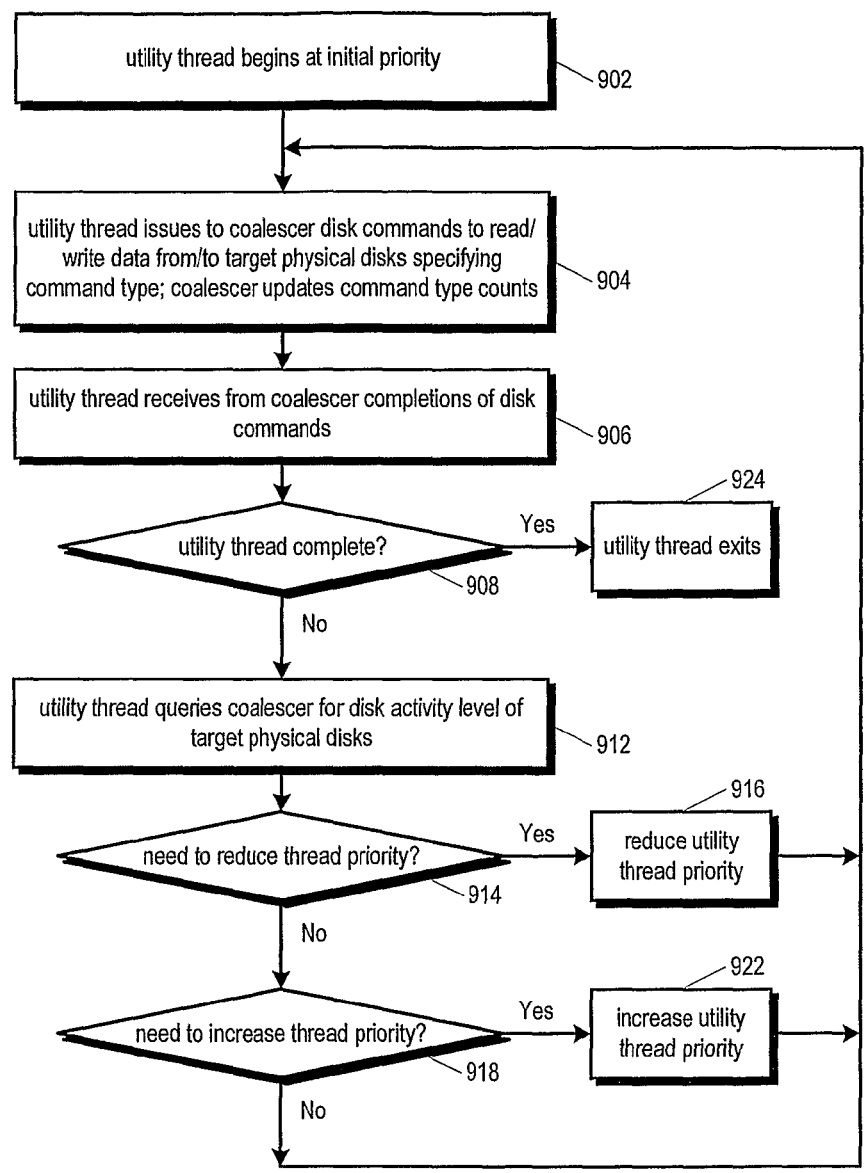
FIG. 9 is a flowchart illustrating operation of the RAID controller of FIG. 1 according to the present invention.

Referring now to FIG. 9, a flowchart illustrating operation of the RAID controller 102 of FIG. 1 according to the present invention is shown. The flowchart of FIG. 9 illustrates how utility threads 214 adjust their priority based on the host command type count 312 and non-host command type count 314 maintained by the coalescer 208 for each of the physical disks 152. Flow begins at block 902.

At block 902, a utility thread 214 begins execution at an initial priority. In one embodiment, there are three possible priorities at which utility threads 214 may execute. A high priority utility thread 214 executes without regard for the host command type count 312 and non-host command type count 314 of the physical disks 152. A medium priority utility thread 214 adjusts its priority based on the host command type count 312 and non-host command type count 314 of the physical disks 152, and in particular based upon the value of the host command type count 312. In one embodiment, the reconstruct and RAID 5 parity check utility threads 214 initially execute at medium priority. A low, or background, priority utility thread 214 only issues disk commands when the host command type count 312 is zero. In one embodiment, the scrub utility thread 214 initially executes at low priority. Flow proceeds to block 904.

At block 904, the utility thread 214 issues to the coalescer 208 one or more disk commands to read/write data from/to one or more target physical disks 152. The disk commands specify the command type, which for most utility threads 214 is a non-host command type. In response, the coalescer 208 updates the appropriate host command type count 312 and non-host command type count 314 for the physical disks 152 accordingly. Flow proceeds to block 906.

At block 906, the utility thread 214 receives from the coalescer 208 completions of the disk commands issued at block 904. Flow proceeds to decision block 908.

At decision block 908, the utility thread 214 determines whether it has completed its task. If so, flow proceeds to block 924, at which the utility thread 214 exits and flow ends; otherwise, flow proceeds to block 912.

At block 912, the utility thread 214 queries the coalescer 208 to determine the activity levels of the physical disks 152, as indicated by the host command type count 312 and non-host command type count 314 of the physical disks 152. Flow proceeds to decision block 914.

At decision block 914, the utility thread 214 determines whether it needs to reduce its priority based on the information received at block 912. If so, flow proceeds to block 916; otherwise, flow proceeds to decision block 918.

At block 916, the utility thread 214 reduces its priority. Flow returns to block 904.

At decision block 918, the utility thread 214 determines whether it needs to increase its priority based on the information received at block 912. If so, flow proceeds to block 922; otherwise, flow returns to block 904.

At block 922, the utility thread 214 increases its priority. Flow returns to block 904.

Advantageously, operation according to FIG. 9 increases the likelihood that the RAID controller 102 will continue to provide a desirable quality of service for the I/O request stream generated by the host computers 114 even in the presence of a utility thread 214 running. That is, operation according to FIG. 9 advantageously causes the utility thread 214 to take longer to complete its task in the presence of a high rate of host computer 114 requests than in the presence of a low rate of host computer 114 requests. Furthermore, the operation according to FIG. 9 is dynamic on a relatively small granularity such that the RAID controller 102 can quickly increase the priority of the utility thread 214 during low host computer 114 I/O request rate times. In one embodiment, the utility thread 214 also takes into account the idle percentage of the CPU 108 in determining whether to reduce or increase its priority according to decision block 914 and 918.

Although the present invention and its objects, features, and advantages have been described in detail, other embodiments are encompassed by the invention. For example, although embodiments have been described in which particular types of physical disks are controlled by the RAID controller, the invention is not limited thereto; rather, disk commands may be coalesced as described herein for issuance to any type of disk.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A redundant array of inexpensive disks (RAID) controller for efficiently transferring data with a redundant array of physical disks, comprising:
   a memory, for storing for each of the physical disks a queue of commands to issue to the physical disk, wherein a portion of said commands in said queues specify user data specified by a host computer to be transferred with the physical disks, and a portion of said commands, generated by the RAID controller independent of host computer I/O requests, specify redundancy data to be transferred with the physical disks; and
   a processor, coupled to said memory, configured to execute coalescer code configured to receive command completions from the physical disks, and in response thereto, for each of the physical disks to:
   coalesce into a single command two or more of said commands in said queue that have a same read/write type and specify adjacent locations on the physical disk; and
   issue to the physical disk said single coalesced command.

2. The controller of claim 1, wherein said memory is further configured to
   store for each of the physical disks:
   a maximum depth of commands to issue to the physical disk; and
   a number of pending commands issued to and uncompleted by the physical disk;
   wherein said coalescer code is further configured to receive new commands to issue to the physical disks, and in response thereto, for each of the new commands and physical disks to:
   determine whether said number of pending commands is less than said maximum depth for the physical disk;
   enqueue said new command on said queue for the physical disk, if said number of pending commands is not less than said maximum depth; and
   issue said new command to the physical disk, if said number of pending commands is less than said maximum depth.

3. The controller of claim 2, wherein said coalescer code is further configured to:
   increment said number of pending commands for the respective physical disk, in response to issuing said new command; and
   decrement said number of pending commands for the respective physical disk, in response to receiving said completion of a command.

4. The controller of claim 2, wherein said processor is further configured to execute initialization code configured to:
   determine a type of each of the physical disks; and
   store said maximum depth of commands for each of the physical disks based on said type.

5. The controller of claim 4, wherein said initialization code determining said type of each of the physical disks comprises issuing an inquiry command to each of the physical disks.

6. The controller of claim 5, wherein said initialization code is further configured to determine said maximum depth of commands from a predetermined table stored in said memory based on said type obtained in response to said inquiry command.

7. The controller of claim 5, wherein said inquiry command comprises a SCSI INQUIRY command.

8. The controller of claim 5, wherein said inquiry command comprises a SATA IDENTIFY DEVICE command.

9. The controller of claim 4, wherein said maximum depth of commands for one or more types of the physical disks is 1.

10. The controller of claim 1, wherein said memory is further configured to store for each of the physical disks:
a maximum command length, specifying a maximum amount of data to be transferred by the physical disk in response to a disk command;
wherein when said coalescer code coalesces into said single command said two or more of said commands, said coalesced single command specifies an amount of data to be transferred that is less than or equal to said maximum command length.

11. The controller of claim 10, wherein said processor is further configured to execute initialization code configured to:
determine a type of each of the physical disks; and
store said maximum command length for each of the physical disks based on said type.

12. The controller of claim 11, wherein said initialization code is further configured to determine said maximum command length from a predetermined table stored in said memory based on said physical disk type.

13. The controller of claim 1, wherein said coalescer code is further configured to:
determine whether said single coalesced command completed with an error; and
if so, separately issue to the physical disk each of said two or more of said commands previously included in said single coalesced command.

14. The controller of claim 13, wherein said coalescer code is further configured to separately issue to the physical disk each of said two or more of said commands previously included in said single coalesced command without exceeding a previously determined maximum depth of commands to issue to the physical disk.

15. The controller of claim 1, wherein said coalescer code is further configured to keep, for each of the physical disks, a count of a type of said commands on said queue, wherein said type comprises commands generated in response to an I/O request received from a host computer in communication with the RAID controller.

16. The controller of claim 15, wherein said coalescer code provides said count to at least one utility thread executed by said processor, wherein said utility thread selectively adjusts its execution priority based on said count.

17. The controller of claim 15, wherein said coalescer code is further configured to keep, for each of the physical disks, a second count of a second type of said commands on said queue, wherein said second type comprises commands generated internally by the RAID controller without respect to an I/O request received from a host computer.

18. The controller of claim 1, wherein said coalescer code coalescing two or more of said commands comprises creating said single command that specifies all disk blocks specified by each of said two or more of said commands.

19. The controller of claim 1, wherein any two commands of said two or more of said commands are adjacent if one of said two commands specifies a first disk block address that immediately follows in sequence a last disk block address specified by the other of the two commands.

20. The controller of claim 1, wherein for said queue of each of the physical disks, a portion of said commands specify user data, and a portion of said commands specify redundancy data.

21. A method for efficiently transferring data with a redundant array of physical disks controlled by a redundant array of inexpensive disks (RAID) controller, the method comprising:
maintaining for each of the physical disks a queue of commands to issue to the physical disk, wherein a portion of the commands in the queues specify user data, and a portion of the commands specify redundancy data; and
receiving command completions from the physical disks, and in response thereto, for each of the physical disks:
coalescing into a single command two or more of the commands, generated by the RAID controller independent of host computer I/O requests, in the queue that specify adjacent locations on the physical disk and have a same read/write type; and
issuing to the physical disk the single coalesced command.

22. The method of claim 21, further comprising:
storing for each of the physical disks:
a maximum depth of commands to issue to the physical disk; and
a number of pending commands issued to and uncompleted by the physical disk; and
receiving new commands to issue to the physical disks, and in response thereto, for each of the new commands and physical disks:
determining whether the number of pending commands is less than the maximum depth for the physical disk;
enqueuing the new command on the queue for the physical disk, if the number of pending commands is not less than the maximum depth; and
issuing the new command to the physical disk, if the number of pending commands is less than the maximum depth.

23. The method of claim 22, further comprising:
incrementing the number of pending commands for the respective physical disk, in response to said issuing the new command; and
decrementing the number of pending commands for the respective physical disk, in response to said receiving the completion of a command.

24. The method of claim 22, further comprising:
determining a type of each of the physical disks; and
storing the maximum depth of commands for each of the physical disks based on the type.

25. The method of claim 24, further comprising:
determining the maximum depth of commands from a predetermined table stored in the memory based on the physical disk type.

26. The method of claim 21, further comprising:
storing for each of the physical disks a maximum command length, specifying a maximum amount of data to be transferred by the physical disk in response to a disk command;
wherein the coalesced single command specifies an amount of data to be transferred that is less than or equal to the maximum command length.

27. The method of claim 21, further comprising:
determining whether the single coalesced command completed with an error; and
if so, separately issuing to the physical disk each of the two or more of the commands previously included in the single coalesced command.

28. The method of claim 21, further comprising:
keeping, for each of the physical disks, a count of a type of the commands on the queue, wherein the type comprises commands generated in response to an I/O request received from a host computer in communication with the RAID controller.

29. The method of claim 28, further comprising:
providing the count to a utility thread; and
the utility thread selectively adjusting its execution priority based on the count.

30. The method of claim 21, wherein for the queue of each of the physical disks, a portion of the commands specify user data to be transferred with the physical disk and a portion of the commands specify redundancy data to be transferred with the physical disk.

31. The method of claim 21, wherein said maintaining comprises, for each of the queues, adding the commands to the queue in received order.

32. The method of claim 31, wherein said coalescing comprises, for each of the queues, selecting a first in the received order of the commands in the queue, and coalescing one or more of the commands in the queue that are adjacent to and have a same read/write type as the first command in the received order.

33. A redundant array of inexpensive disks (RAID) controller for efficiently writing to a redundant array of physical disks comprising a logical disk, comprising:
a memory; and
a CPU, coupled to said memory, configured to:
receive from a host computer a plurality of I/O requests, each specifying user data to be written to the logical disk;
generate parity data from said user data and store said parity data in said memory;
generate a first plurality of disk commands, each specifying a portion of said user data to be written to one of the physical disks in the redundant array;
generate a second plurality of disk commands, each specifying a portion of said parity data to be written to one of the physical disks in the redundant array;
accumulate into a list for each of the physical disks of the redundant array said first and second plurality of disk commands specifying the respective physical disk;
for each of said lists, coalesce two or more adjacent ones of said disk commands in said list into a single disk command; and
issue each of said single disk commands to the respective physical disk, rather than individually issuing said commands in said lists to the physical disks.

34. The controller of claim 33, wherein said memory is further configured to
store for each of the physical disks:
a maximum depth of commands to issue to the physical disk; and
a number of pending commands issued to and uncompleted by the physical disk;
wherein said CPU is further configured to generate new commands to issue to the physical disks, and for each of the new commands and physical disks to:
determine whether said number of pending commands is less than said maximum depth for the physical disk;
add said new command to said list for the physical disk, if said number of pending commands is not less than said maximum depth; and
issue said new command to the physical disk, if said number of pending commands is less than said maximum depth.

35. The controller of claim 34, wherein said CPU is further configured to:
determine a type of each of the physical disks; and
store said maximum depth of commands for each of the physical disks based on said type.

36. The controller of claim 33, wherein said CPU is further configured to:
determine whether said single coalesced command completed with an error; and
if so, separately issue to the physical disk each of said two or more adjacent ones of said disk commands previously included in said single coalesced disk command.

37. A method for improving the performance of a redundant array of inexpensive disks (RAID) controller to write data to a redundant array of physical disks comprising a logical disk, the method comprising:
receiving from a host computer a plurality of I/O requests, each specifying user data to be written to the logical disk;
generating parity data from the user data, in response to said receiving;
generating a first plurality of disk commands, in response to said receiving, each of the first plurality of disk commands specifying a portion of the user data to be written to one of the physical disks in the redundant array;
generating a second plurality of disk commands, after said generating the parity data, each of the second plurality of disk commands specifying a portion of the parity data to be written to one of the physical disks in the redundant array;
accumulating into a list for each of the physical disks of the redundant array the first and second plurality of disk commands specifying the respective physical disk;
for each of the lists, coalescing two or more adjacent ones of the disk commands in the list into a single disk command, after said accumulating; and
issuing each of the single disk commands to the respective physical disk, rather than individually issuing the commands in the lists to the physical disks.

38. The method of claim 37, wherein said accumulating comprises, for each of the lists, adding the disk commands to the list in received order.

39. The method of claim 38, wherein said coalescing comprises, for each of the lists, selecting a first in the received order of the disk commands in the list, and coalescing one or more of the disk commands in the list adjacent to the first in the received order.

40. A method for improving the performance of a redundant array of inexpensive disks (RAID) controller to write data to a redundant array of physical disks comprising a logical disk, the method comprising:
receiving from a host computer a plurality of I/O requests, each specifying user data to be written to the logical disk;
generating a first plurality of disk commands, in response to said receiving, each of the first plurality of disk commands specifying a portion of the user data to be written to one of the physical disks in the redundant array;
generating a second plurality of disk commands, each of the second plurality of disk commands specifying a portion of mirror data of the user data to be written to one of the physical disks in the redundant array;

accumulating into a list for each of the physical disks of the redundant array the first and second plurality of disk commands specifying the respective physical disk;

for each of the lists, coalescing adjacent ones of the disk commands in the list into a single disk command, after said accumulating; and issuing each of the single disk commands to the respective physical disk, rather than individually issuing the commands in the lists to the physical disks.

41. A method for improving the performance of a redundant array of inexpensive disks (RAID) controller to read data from a redundant array of physical disks comprising a logical disk, wherein one of the physical disks in the array has failed causing a portion of the data to be unavailable on the failed disk, the method comprising:

receiving from a host computer a plurality of I/O requests, each specifying user data to be read from the logical disk;

generating a first plurality of disk commands, in response to said receiving, each of the first plurality of disk commands specifying a portion of the user data to be read from one of the physical disks in the redundant array;

generating a second plurality of disk commands, in response to said receiving, each of the second plurality of disk commands specifying a portion of parity data to be read from one of the physical disks in the redundant array;

accumulating into a list for each of the physical disks of the redundant array the first and second plurality of disk commands specifying the respective physical disk;

for each of the lists, coalescing adjacent ones of the disk commands in the list into a single disk command, after said accumulating; and issuing each of the single disk commands to the respective physical disk, rather than individually issuing the commands in the lists to the physical disks; and receiving the user data and the parity data, in response to said issuing.

42. The method of claim 41, further comprising:

reconstructing the unavailable portion of the data from the received user data and the received parity data, in response to said receiving.

* * * * *